United States Patent
Aoki

(10) Patent No.: US 8,113,745 B2
(45) Date of Patent: Feb. 14, 2012

(54) PRESSURE TANK, AN DEVICE FOR FEEDING POWDER TO A CONVEYING PIPE, AND ITS FEEDING METHOD, AND METHOD FOR DETERMINING FEEDING INTERVALS OF POWDER TO THE CONVEYING PIPE

(75) Inventor: Yukinori Aoki, Kurate-machi (JP)

(73) Assignee: Sintokogio, Ltd., Aichi Ken (JP)

( * ) Notice: Subject to any disclaimer, the term of this patent is extended or adjusted under 35 U.S.C. 154(b) by 426 days.

(21) Appl. No.: 12/301,503

(22) PCT Filed: May 29, 2007

(86) PCT No.: PCT/JP2007/060897
§ 371 (c)(1),
(2), (4) Date: May 6, 2009

(87) PCT Pub. No.: WO2007/139106
PCT Pub. Date: Dec. 6, 2007

(65) Prior Publication Data
US 2010/0021248 A1      Jan. 28, 2010

(30) Foreign Application Priority Data

May 31, 2006  (JP) ................................ 2006-151533
Sep. 1, 2006  (JP) ................................ 2006-237426

(51) Int. Cl.
B65G 53/00    (2006.01)

(52) U.S. Cl. .............. 406/197; 406/14; 406/19; 406/29; 406/50; 406/85; 406/126; 406/144; 406/151; 406/168

(58) Field of Classification Search .................... 406/14, 406/19, 29, 50, 85, 151, 168, 126, 144, 197
See application file for complete search history.

(56) References Cited

U.S. PATENT DOCUMENTS 1,663,031 A  *  3/1928  Weigele .......................... 406/17
(Continued)

FOREIGN PATENT DOCUMENTS

JP          01-098522          4/1989
(Continued)

*Primary Examiner* — Joseph A Dillon, Jr.
(74) *Attorney, Agent, or Firm* — Finnegan, Henderson, Farabow, Garrett & Dunner L.L.P.

(57) ABSTRACT

A pressure tank having a simple structure to intermittently feed powder to a conveying pipe, and a method for determining the intervals for feeding the powder to the conveying pipe. The pressure tank includes a tank body used as a structure of a pressure vessel having a receiving port at its upper portion and a discharging port at its lower portion, a first check valve disposed just under the receiving port so that it can freely move up and down, and so that it can close the receiving port by its upward movement that is caused by means of compressed air, and a second check valve disposed just under the discharging port so that it can freely move up and down, and so that it can close the discharging port by its upward movement that is caused by means of compressed air. To determine the intervals for feeding the powder to the conveying pipe, the apparatus is controlled based on measurements of the pressure loss or of the time that is required for feeding the powder to the conveying pipe, so that the pressure loss of the compressed air in the conveying pipe corresponds to the pressure of the compressed air supplied to the conveying pipe.

3 Claims, 1 Drawing Sheet

U.S. PATENT DOCUMENTS

Figure 1:
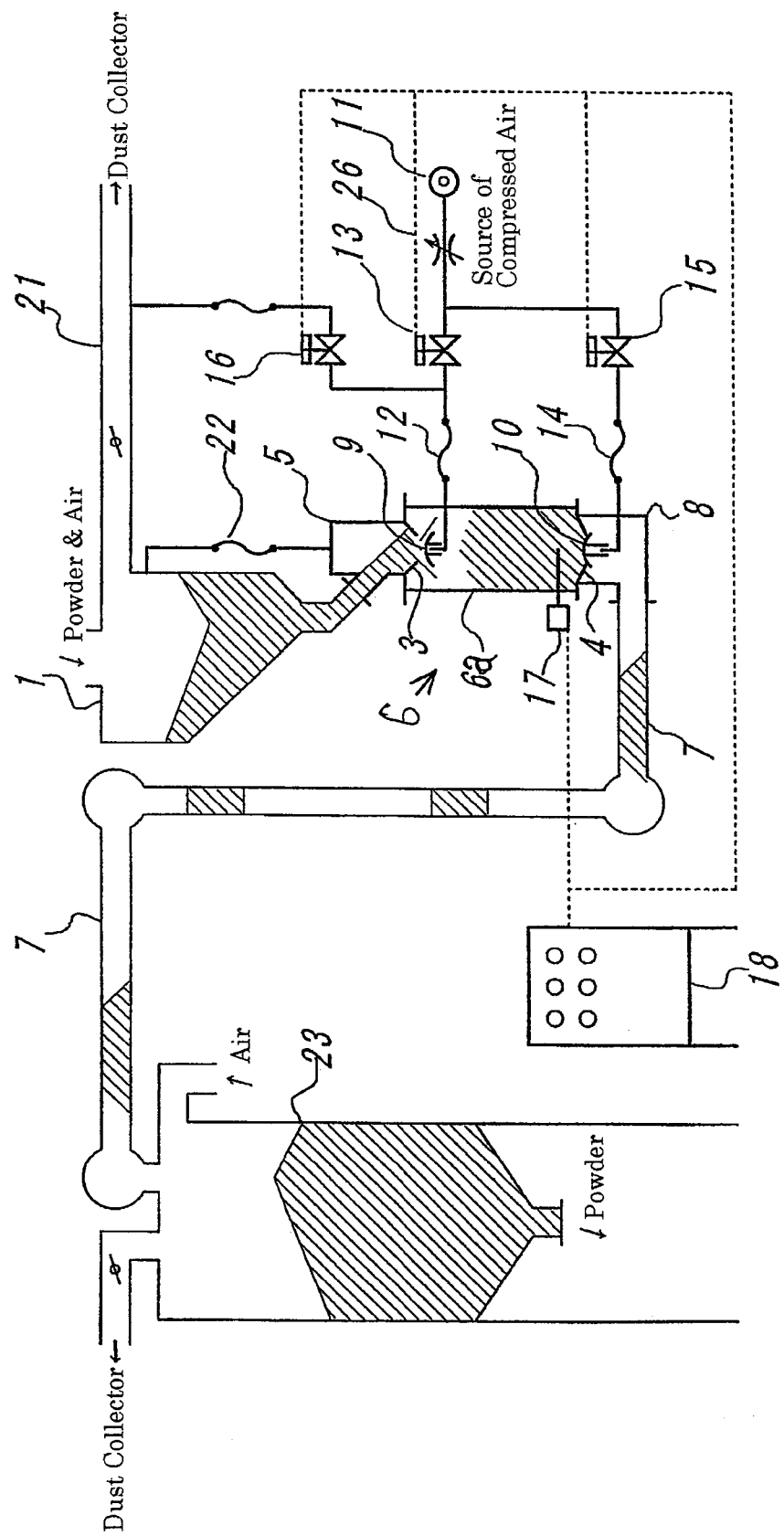

| | | | | |
|---|---|---|---|---|
| 3,604,758 | A | * | 9/1971 | Flain et al. ............... 406/50 |
| 4,029,362 | A | * | 6/1977 | Kortenbusch ............. 406/18 |
| 4,061,401 | A | * | 12/1977 | Brown ...................... 406/30 |
| 4,699,548 | A | * | 10/1987 | Bergstrom ................ 406/109 |
| 4,775,267 | A | * | 10/1988 | Yamamoto ................ 406/50 |
| 5,549,421 | A | * | 8/1996 | Reinhardt et al. ......... 406/3 |
| 5,562,366 | A | * | 10/1996 | Paulson ..................... 406/12 |
| 6,085,939 | A | * | 7/2000 | Geweke et al. ........... 222/61 |
| 6,287,056 | B1 | * | 9/2001 | Szikszay ................... 406/197 |
| 6,786,681 | B2 | * | 9/2004 | Grasshoff .................. 406/11 |
| 6,823,904 | B2 | * | 11/2004 | Finke et al. ............... 141/61 |
| 6,994,497 | B1 | * | 2/2006 | Eriksson et al. .......... 406/124 |

FOREIGN PATENT DOCUMENTS

| | | |
|---|---|---|
| JP | 11-303585 | 11/1999 |
| JP | 2006-131330 | 5/2006 |

* cited by examiner

PRESSURE TANK, AN DEVICE FOR FEEDING POWDER TO A CONVEYING PIPE, AND ITS FEEDING METHOD, AND METHOD FOR DETERMINING FEEDING INTERVALS OF POWDER TO THE CONVEYING PIPE

TECHNICAL FIELD

This invention relates to a so-called plug-conveying system. It conveys powder through a conveying pipe by using compressed air. Particularly, it relates to a pressure tank that is used for an apparatus for intermittently feeding a predetermined amount of powder to a conveying pipe, and to an apparatus and a method for feeding the powder to the conveying pipe by using the pressure tank.

Further, this invention relates to a method for determining the intervals for feeding powder to a conveying pipe. Particularly, it further relates to a method for interlocking a plurality of timers to control the apparatus for feeding the powder to the conveying pipe, to intermittently feeding a predetermined amount of the powder to the conveying pipe, when the powder is conveyed through the conveying pipe, by using compressed air, by means of a method of a plug-conveying system.

BACKGROUND OF THE INVENTION

There is a conventional apparatus for conveying powder comprising:
  a pressure tank comprising:
  a rotary valve, which ejects a predetermined amount of powder from the pressure tank, driven by a motor and disposed at the bottom of the pressure tank,
  a receiving port having a damper and disposed at the top of the pressure tank,
  a first pressure gauge disposed at the pressure tank,
  a load cell to weigh the pressure tank,
  wherein the pressure tank is supported by means of the load cell,
  a supply tank disposed above the pressure tank, comprising:
  a feeding port having a damper and disposed at the top of the supply tank,
  a discharging port disposed at the bottom of the supply tank,
  a second pressure gauge disposed at the supply tank,
  wherein the load cell and the dampers are electrically connected to a control unit for computing measurements and controlling devices,
  wherein the receiving port of the pressure tank communicates with the discharging port of the supply tank by means of a damper and a pipe that can be extended and contracted,
  wherein the upper and inner portions of the pressure tank communicate with those of the supply tank by means of a pipe and two opening and closing valves,
  wherein a discharging pipe communicates with the point between the two opening and closing valves disposed in the piping, and
  wherein the first pressure gauge and the second pressure gauge are electrically connected to a control unit for comparing and computing measurements.

Patent Document 1: Japanese Patent Laid-Open Publication No. H10-35886

DISCLOSURE OF INVENTION

However, in this conventional apparatus for feeding powder to a conveying pipe, there are problems, such as that the structure of the apparatus is complicated, large, and costly.

This invention was conceived to solve these problems. The first purpose of this invention is to provide a pressure tank that is used for an apparatus for intermittently feeding powder to a conveying pipe, and that has a simple structure. It is also to provide an apparatus and a method for feeding the powder to the conveying pipe by using the pressure tank.

The second purpose of this invention is, when the powder is conveyed through the conveying pipe by using the compressed air, which is the so-called plug-conveying system, to provide a method for adjusting the pressure of the compressed air by interlocking a plurality of timers to control the apparatus for feeding the powder to the conveying pipe, and to intermittently supply a predetermined amount of the powder to the conveying pipe.

To solve the problems explained in the above paragraphs, the constitution of the pressure tank of the invention is:
  a pressure tank used for an apparatus for intermittently feeding a predetermined amount of powder to a conveying pipe to convey the powder by compressed air through the conveying pipe, by means of a method for a plug-conveying system, the pressure tank comprising:
  a tank body used as a pressure vessel structure having a receiving port at its upper portion and a discharging port at its lower portion,
  a first check valve disposed just under the receiving port so that it can freely move up and down, and so that it can close the receiving port by its upward movement that is caused by means of compressed air, and
  a second check valve disposed just under the discharging port so that it can freely move up and down, and so that it can close the discharging port by its upward movement that is caused by means of compressed air.

The constitution of the apparatus of the invention for feeding powder to a conveying pipe is:
  an apparatus for intermittently feeding a predetermined amount of powder to a conveying pipe by using the pressure tank, the apparatus comprising:
  a hopper for storing the powder to be conveyed, wherein the hopper has an opening for discharging the powder at its lower portion, which opening faces the receiving port of the pressure tank body,
  a chuting means for connecting the hopper to the receiving port of the pressure tank body, and having said opening communicate with said port,
  a valve box for disposed at the lower portion of the tank body, wherein one end of the valve box is connected to and sealed to the bottom of the tank body so that the valve box covers the discharging port of the tank body, and wherein the other end of the valve box is connected to, and communicates with, the root of the conveying pipe,
  a first electromagnetic valve for closing and opening a first conduit pipe connecting the lower portion of the first check valve to the source of the compressed air,
  a second electromagnetic valve for closing and opening a second conduit pipe connecting the lower portion of the second check valve to the source of the compressed air,
  a third electromagnetic valve that can exhaust the compressed air in the first conduit pipe,
  a detecting means for sensing the existence or nonexistence of the powder in the pressure tank body, and
  a controlling means for controlling the opening and closing switch of the first, the second, and the third electromagnetic valve based on the results of the detecting means, by interlocking a plurality of timers.

The constitution of a method of the invention for intermittently feeding a predetermined amount of powder to a conveying pipe by using the apparatus comprises:

when the detecting means senses the nonexistence of the powder in the pressure tank body, compressed air in the tank body is discharged by opening the third electromagnetic valve, after closing the first electromagnetic valve. Then the receiving port of the tank body is opened because the first check valve descends under its self-weight. As a result of these operations, the powder in the hopper slides and flows into the tank body under its self-weight. Then, when the compressed air is supplied to the second check valve and the valve box for the second check valve by opening the second electromagnetic valve, the discharging port of the pressure tank is closed, because the second check valve ascends.

When the powder flows into the pressure tank body, the detecting means senses the existence of the powder in the tank body. Then a plurality of timers start to measure the time. After a predetermined time has passed and then the third electromagnetic valve is closed, the first electromagnetic valve is opened. Consequently, while the powder continues flowing into the tank body, since the compressed air is supplied to the first check valve and the tank body, the receiving port of the tank body is closed by means of the ascended first check valve, and the inner side of the tank body is pressurized. Then, the discharging port of the tank body is opened by means of the descending second check valve, and the powder in the tank body is supplied to the conveying pipe. The powder deeded to the conveying pipe is transferred to a tank for storing the powder by means of the method of the plug-conveying system.

The constitution of a first method for determining the intervals for feeding the powder to the conveying pipe is:

a method for determining the times to be set by a plurality of timers to feed powder to a conveying pipe by means of compressed air in a plug-conveying system that uses an apparatus for feeding powder to the pipe, the apparatus comprising:

a hopper for storing the powder to be conveyed, wherein the hopper has an opening for discharging the powder at its lower end, a pressure tank used as the structure of a pressure vessel having a receiving port at its upper portion and a discharging port at its lower portion, wherein the receiving port faces the opening for discharging the powder of the hopper, a valve box for the second check valve disposed at the lower portion of the tank body, wherein one end of the valve box is connected to and sealed to the outer and lower surface of the tank body so that the valve box covers the discharging port of the tank body, and wherein the other end of the valve box is connected to and communicates with the root of the conveying pipe, a first check valve disposed inside the tank body and just under the receiving port so that it can freely move up and down, and so that it can close the receiving port by its upward movement that is caused by means of compressed air, a second check valve disposed inside the valve box and just under the discharging port so that it can freely move up and down, and so that it can close the discharging port by its upward movement that is caused by means of compressed air, a first electromagnetic valve for closing and opening a first conduit pipe connecting the lower portion of the first check valve to the source of the compressed air, a second electromagnetic valve for closing and opening a second conduit pipe connecting the lower portion of the second check valve to the source of the compressed air, a third electromagnetic valve that can exhaust the compressed air in the first conduit pipe, a detecting means for sensing the existence or the nonexistence of the powder in the tank body, and a controlling means for controlling the opening and closing of the first, the second, and the third electromagnetic valve based on the results of the detecting means, by interlocking a plurality of timers, the method that is used for intermittently feeding a predetermined amount of powder to a conveying pipe comprising:

a step for measuring the time that is required for feeding the powder in the tank body to the conveying pipe, a step for adjusting the times to be set by the plurality of timers to control the electromagnetic valves based on the measurements so that pressure loss of the compressed air in the conveying pipe corresponds to the pressure of the compressed air supplied to the conveying pipe.

The constitution of a second method for determining the intervals for feeding powder to the conveying pipe is:

a method for determining the intervals for feeding powder to a conveying pipe by means of compressed air in a plug-conveying system that uses an apparatus for feeding powder to a conveying pipe, the apparatus comprising:

a hopper for storing the powder to be conveyed, wherein the hopper has an opening for discharging the powder at its lower portion, a tank body used as a structure of a pressure vessel having a receiving port at its upper portion and a discharging port at its lower portion, wherein the receiving port faces the opening for discharging the powder of the hopper, a valve box for the second check valve disposed at the lower portion of the tank body, wherein one end of the valve box is connected to and sealed to the outer and lower surface of the tank body so that the valve box covers the discharging port of the tank body, and wherein the other end of the valve box is connected to and communicates with the root of the conveying pipe, a first check valve disposed inside the tank body and just under the receiving port so that it can freely move up and down, and so that it can close the receiving port by its upward movement that is caused by means of compressed air, a second check valve disposed inside the valve box and just under the discharging port so that it can freely move up and down, and so that it can close the discharging port by its upward movement that is caused by means of compressed air, a first electromagnetic valve for closing and opening a first conduit pipe connecting the lower portion of the first check valve to the source of the compressed air, a second electromagnetic valve for closing and opening a second conduit pipe connecting the lower portion of the second check valve to the source of the compressed air, a third electromagnetic valve that can exhaust the compressed air in the first conduit pipe, a detecting means for sensing the existence or nonexistence of the powder in the tank body, and a controlling means for controlling the opening and closing of the first, the second, and the third electromagnetic valve based on the results of the detecting means, by means of a plurality of timers, the method that is used for intermittently feeding a predetermined amount of powder to a conveying pipe, comprising:

a step for measuring the pressure loss of the compressed air in the conveying pipe, and a step for adjusting the times to be set by the plurality of timers so that the pressure loss of the compressed air in the conveying pipe corresponds to the pressure of the compressed air supplied to the conveying pipe.

The constitution of the first method for determining the intervals for feeding the powder to the conveying pipe further comprises:

a step for exhausting the compressed air in the tank body by opening the third electromagnetic valve after closing the first electromagnetic valve when the detecting means senses the nonexistence of the powder in the tank body, a step for conveying the powder from the hopper into the tank body by opening the receiving port by descending the first check valve, a step for feeding the compressed air to the second check valve and the valve box for the second check valve by opening the second electromagnetic valve, a step for closing the discharging port of the tank body by ascending the second check valve, a step for opening the first electromagnetic valve after closing the third electromagnetic valve after a predetermined time has passed from the time the detecting means senses the existence of the powder in the tank body, a step for closing the receiving port and pressurizing the inside of the tank body by ascending the first check valve by feeding the compressed air to the first check valve and the tank body, a step for feeding the powder in the tank body to the conveying pipe by opening the discharge port of the tank body by descending the second check valve, a step for calculating the time that is required for feeding the powder from the tank body to the conveying pipe based on two data points regarding the time measured by the controlling means, after the detecting means senses the nonexistence of the powder in the tank body, wherein one data point regarding time is the time the first electromagnetic valve is opened, and the other data point regarding time is the time the detecting means senses the nonexistence of the powder, a step for calculating the time when the powder in the tank body should be supplied to the conveying pipe at next conveyance, by multiplying the time that is required for feeding the powder from the tank body to the conveying pipe and a constant value determined based on the ratio of the inner volume of the pipe to the inner volume of the tank body, a step for determining the time that the timer is to open the first electromagnetic valve and to close the third electromagnetic valve after the detecting means senses the existence of the powder in the tank body, based on the time that the powder in the tank body should be supplied to the conveying pipe at next conveyance, and a step for adjusting the times to be set by the plurality of timers so that the pressure loss of the compressed air in the conveying pipe corresponds to the pressure of the compressed air supplied to the conveying pipe.

The second method for determining the intervals for feeding the powder to the conveying pipe further comprises:

a step for exhausting the compressed air in the tank body by opening the third electromagnetic valve after closing the first electromagnetic valve when the detecting means senses the nonexistence of the powder in the tank body, a step for conveying the powder from the hopper into the tank body by opening the receiving port by descending the first check valve, a step for feeding the compressed air to the second check valve and the valve box for the second check valve by opening the second electromagnetic valve, a step for closing the discharging port of the tank body by ascending the second check valve, a step for opening the first electromagnetic valve after closing the third electromagnetic valve when a predetermined time has passed from the time the detecting means senses the existence of the powder in the tank body, a step for closing the receiving port and compressing the inside of the tank body by ascending the first check valve by feeding the compressed air to the first check valve and the tank body, a step for feeding the powder in the tank body to the conveying pipe by opening the discharge port of the tank body by descending the second check valve, a step for measuring the pressure loss of the compressed air in the conveying pipe when the powder is supplied to the pipe by closing the third electromagnetic valve and by opening the first electromagnetic valve, and a step for adjusting the times to be set by the plurality of timers so as to cause the time when the powder should be supplied to the conveying pipe at next conveyance extended if the pressure loss of the compressed air in the conveying pipe is greater than the pressure of the compressed air supplied to the conveying pipe, or so as to cause the time when the powder should be deeded to the conveying pipe at next conveyance advanced if the pressure loss of the compressed air in the conveying pipe is less than the pressure of the compressed air supplied to the conveying pipe, based on the measurement of the pressure loss.

As explained in the above paragraphs, the pressure tank of this invention has the following elements:

a pressure tank used for an apparatus for intermittently feeding a predetermined amount of powder to a conveying pipe to convey the powder by compressed air through the conveying pipe by means of a method of a plug-system, the pressure tank comprising:

a tank body used as a structure of a pressure vessel having a receiving port at its upper portion and a discharging port at its lower portion, a first check valve disposed just under the receiving port so that it can freely move up and down, and so that it can close the receiving port by its upward movement that is caused by means of compressed air, and a second check valve disposed just under the discharging port so that it can freely move up and down, and so that it can close the discharging port by its upward movement that is caused by means of compressed air.

Thus, compared to the conventional pressure tank, the tank of this invention has excellent advantages, such as its simple and compact structure and its lower cost.

The method for determining the intervals for feeding powder to the conveying pipe of this invention has these elements:

a method for determining the intervals for feeding powder to a conveying pipe by means of compressed air in a plug-conveying system that uses an apparatus for feeding powder to a conveying pipe, the apparatus comprising:

a hopper for storing the powder to be conveyed, wherein the hopper has an opening for discharging the powder at its lower portion, a tank body used as a structure of a pressure vessel having a receiving port at its upper portion and a discharging port at its lower portion, wherein the receiving port faces the opening for discharging the powder in the hopper, a valve box for the second check valve disposed at the lower portion of the tank body, wherein one end of the valve box is connected and sealed to the outer and lower surface of the tank body so that the valve box covers the discharging port of the tank body, and wherein the other end of the valve box is connected to and communicates with the root of the conveying pipe, a first check valve disposed inside the tank body and just under the receiving port so that it can freely move up and down, and so that it can close the receiving port by its upward movement that is caused by means of compressed air, and a second check valve disposed inside the valve box and just under the discharging port so that it can freely move up and down, and so that it can close the discharging port by its upward movement that is caused by means of compressed air, a first electromagnetic valve for closing and opening a first conduit pipe connecting the lower portion of the first check valve to the source of the compressed air, a second electromagnetic valve for closing and opening a second conduit pipe connecting the lower portion of the second check valve to the source of the compressed air, a third electromagnetic valve that can exhaust the compressed air in the first conduit pipe, a detecting means for sensing the existence or nonexistence of the powder in the tank body, and a controlling means for controlling the switch of the first, the second, and the third electromagnetic valve based on the results of the detecting means, by means of a plurality of timers, the method that is used for intermittently feeding a predetermined amount of powder to a conveying pipe, comprising:

a step for measuring the time that is required for feeding the powder in the tank body to the pipe, and for controlling the timing for operating the electromagnetic valves based on the measurements so that the pressure loss of the compressed air in the conveying pipe corresponds to the pressure of the compressed air supplied to the conveying pipe, or a step for measuring the pressure loss of the compressed air in the conveying pipe, and for controlling the timing for operating the electromagnetic valves based on the measurements so that the pressure loss of the compressed air in the conveying pipe corresponds to the pressure of the compressed air supplied to the conveying pipe.

Thus, the method of this invention has excellent advantages since the method can be adjusted so as to optimize the pressure of the compressed air in the conveying pipe by controlling the timing for operating the electromagnetic valves to intermittently supply a predetermined amount of the powder to the conveying pipe.

BRIEF DESCRIPTIONS OF THE DRAWINGS

FIG. 1 is a schematic diagram that shows the preferred embodiment of this invention.

PREFERRED EMBODIMENT OF THE INVENTION

First, based on FIG. 1, the apparatus for feeding powder to a pipe is explained in detail.

The apparatus for intermittently feeding a predetermined amount of powder to a conveying pipe 7, which is used for the plug-conveying system that conveys powder by compressed air by means of a conveying pipe 7, has a pressure tank 6.

The pressure tank 6 is comprised of:

a tank body 6a that forms the structure of the pressure vessel, wherein the tank body 6a has a receiving port 3 at its upper portion and a discharging port 4 at its lower portion, a first check valve 9 disposed just under the receiving port 3 so that it can freely move up and down, and so that it can close the receiving port 3 by its upward movement that is caused by means of compressed air, and a second check valve 10 disposed just under the discharging port 4 so that it can freely move up and down, and so that it can close the discharging port 4 by its upward movement that is caused by means of compressed air.

The apparatus for feeding powder to a pipe is comprised of:
the tank 6, a hopper 1 for storing the powder to be conveyed, wherein the hopper has an opening for discharging the powder at its lower portion, which opening faces the receiving port 3 of the tank body 6a of the tank 6, a chuting means 5 for connecting the opening for discharging the powder of the hopper 1 to the receiving port 3 of the tank body 6a of the pressure tank 6, and having said opening communicate with said port, a valve box 8 for the second check valve 10 disposed at the lower portion of the tank body 6a, wherein one end of the valve box 8 is connected and sealed to the outer and lower surface of the tank body 6a so that the valve box 8 covers the discharging port 4 of the tank body 6a, and wherein the other end of the valve box 8 is connected to and communicates with the root of the conveying pipe 7, a first electromagnetic valve 13 for closing and opening a first conduit pipe 12 connecting the lower portion of the first check valve 9 to a source 11 of the compressed air, a second electromagnetic valve 15 for closing and opening a second conduit pipe 14 connecting the lower portion of the second check valve 10 to the source 11 of the compressed air, a third electromagnetic valve 16 that can exhaust the compressed air in the first conduit pipe 12, a level meter 17 as a detecting means for sensing the existence or nonexistence of the powder in the tank body 6a of the tank 6, and a controlling means 18 for controlling the opening and closing of the first, the second, and the third electromagnetic valve 13, 15, 16 based on the results of the level meter 17, by means of a plurality of timers.

The first and the second check valve 9, 10 have a mechanism that can drain a part of the compressed air supplied to the valves 9, 10. The third electromagnetic valve 16 communicates with a duct 21 that is connected to a dust collector. The chuting means 5 communicates with the upper portion of the hopper 1 by means of a conduit pipe 22 so that the pressure in the chuting means 5 equals that in the inner and upper portion of the hopper 1. Further, leading end of the conveying pipe 7 communicates with the tank 23 for storing the powder. The number 26 in FIG. 1 denotes a flow control valve.

The apparatus for feeding powder to the conveying pipe having the elements explained in the above paragraphs can be operated as follows:

When the level meter 17, shown in FIG. 1, detects the nonexistence of the powder in the tank body, the compressed air in the tank body 6a is exhausted by opening the third electromagnetic valve 16 after closing the first electromagnetic valve 13.

By these operations, since the pressure in the tank body 6a is decreased, the first check valve 9 descends under its self-weight, and the receiving port 3 is opened. Consequently, the powder in the hopper 1 slides, and then flows into the tank body 6a by its self-weight by means of the chuting means 5.

At that time, since the compressed air is provided to the second check valve 10 and the valve box 8, the second check valve 10 ascends, and the discharging port 4 is closed. Further, the powder that has already been fed to the conveying pipe 7 is transferred by the compressed air, by means of the method of a plug-conveying system.

When the level meter 17 detects the existence of the powder in the tank body 6a after the powder in the hopper 1 flows into the tank body 6a, a plurality of timers starts. When a predetermined time has passed, the third electromagnetic valve 16 is closed, and then the first electromagnetic valve 13 is opened. At that time, while the powder in the hopper 1 flows into the tank body 6a, since the compressed air is supplied to the first check valve 9 and the tank body 6a, the first check valve 9 ascends, the receiving port 3 is closed, and then the tank body 6a is pressurized.

Since the tank body 6a is pressurized, and since the first check valve 9 descends under its self-weight, the discharging port 4 is opened. Consequently, the powder in the tank body 6a is fed to the conveying pipe 7. The powder that is fed to the conveying pipe 7 is transferred to the tank 23 for storing the powder by means of the method of the plug-conveying system.

When the operations for feeding the conveying pipe with the powder in the tank body 6a are completed, the level meter 17 detects the nonexistence of the powder in the tank body 6a. Then, the same processes as explained in the above paragraphs are repeated.

For the embodiment explained in the above paragraphs, the opening for discharging the powder of the hopper 1 communicates with the receiving port 3 of the tank body 6a by means of the chuting means 5.

However, if the powder is resistant to being scattered like sand, it is possible to omit the chuting means 5 so that the opening for discharging the powder of the hopper 1 directly faces the receiving port 3 of the tank body 6a.

Below, the method for determining the intervals for feeding the powder to the conveying pipe of this invention is explained.

After the powder in the tank body 6a is fed to the conveying pipe 7, if the level meter 17 detects the nonexistence of the powder in the tank body 6a, the controlling means 18 detects the time when the first electromagnetic valve 13 is opened and the time when the level meter 17 detects the nonexistence of the powder in the tank body 6a. The controlling means 18 calculates the time that is required to feed the conveying pipe 7 with the powder in the tank body 6a, based on the two measured times.

Further, the controlling means 18 calculates the time the powder in the tank body 6a should next be fed to the conveying pipe 7, by multiplying the time that is required for feeding the powder from the tank body 6a to the conveying pipe 7 by a constant value that determined based on the ratio of the inner volume of the conveying pipe 7 to the inner volume of the tank body 6a (at minimum: about 3:1). Namely, the time the powder in the tank body 6a should next be fed to the conveying pipe 7 corresponds to the interval that produces intervals of the spaces between the two blocks of the powder that have a plug-like shape in the conveying pipe 7.

Based on the result of the calculation, the controlling means 18 determines the time to be set by the timer to close the third electromagnetic valve 16 and to open the first electromagnetic valve 13, after the level meter 17 detects the existence of the powder in the tank body 6a. Namely, when the level meter 17 detects the existence of the powder in the tank body 6a, the timer starts. Then, after the predetermined time has passed, the third electromagnetic valve 16 is closed and then the first electromagnetic valve 13 is opened. Based on these operations, since the tank body 6a is pressurized by feeding the first check valve 9 and the tank body 6a with the compressed air, the powder in the tank body 6a is fed to the conveying pipe 7. The ratio of the volume of the block of the powder having a plug-like shape in the conveying pipe 7 to the inner volume of the conveying pipe 7 is determined based on the length of the block of the powder having a plug-like shape that is determined by the volume of the tank body 6a and the intervals of the spaces between the two blocks of the powder having a plug-like shape.

As explained in the above paragraphs, the intervals between the blocks of the powder having a plug-like shape is controlled so as to maintain the same ratio of the volume of the powder in the conveying pipe 7 to the inner volume of the conveying pipe 7, and so that the pressure loss of the compressed air in the conveying pipe 7 corresponds to the pressure of the compressed air supplied to the conveying pipe 7.

By repeating those operations, the powder in the tank body 6a is intermittently fed to the conveying pipe 7, and then the powder in the pipe 7 is transferred to the tank 23 for storing the powder by means of the method of the plug-conveying system.

For the embodiments explained above, the times for the plurality of timers are determined based on the measurement of the time that is required for feeding the powder from the tank body 6a to the conveying pipe 7. However, that is not limited to this method.

For example, the following method may be applied. For this method, a pressure switch is disposed at the second conduit pipe 14, and the powder may be material fed to the conveying pipe 7 in the following sequence. When the powder is supplied to the conveying pipe 7 by closing the third electromagnetic valve 16 and opening the first electromagnetic valve 13, any pressure loss caused in the conveying pipe 7 of the compressed air supplied to it is measured. Based on this measurement, if the pressure loss is greater than the pressure of the compressed air supplied to the conveying pipe 7, the times to be set by the plurality of timers are adjusted so that the time that the powder in the tank body 6a is to be supplied to the conveying pipe 7 at the next conveyance becomes long. If the pressure loss is less than the pressure of the compressed air supplied to the conveying pipe 7, the times to be set by the plurality of timers are adjusted so that the time that the powder in the tank body 6a is to be supplied to the conveying pipe 7 at the next conveyance becomes short.

I claim:

1. A method for intermittently feeding a predetermined amount of powder in an apparatus having a pressure tank from which the powder is fed to a conveying pipe, the pressure tank having:
    a tank body used as a structure of a pressure vessel having a receiving port at its upper portion and a discharging port at its lower portion,
    a first check valve disposed just under the receiving port so that it can freely move up and down, and so that it can close the receiving port by its upward movement that is caused by means of compressed air, and
    a second check valve disposed just under the discharging port so that it can freely move up and down, and so that it can close the discharging port by its upward movement that is caused by means of compressed air,
    the apparatus further including:
    a hopper for storing the powder to be conveyed, wherein the hopper has an opening for discharging the powder at its lower portion, which opening faces the receiving port of the tank body of the pressure tank,
    a chuting means for connecting the opening for discharging the powder of the hopper to the receiving port of the tank body of the pressure tank, and having said opening communicate with said port,
    a valve box for the second check valve disposed at the lower portion of the tank body, wherein one end of the valve box is connected to and sealed to the outer and lower surface of the tank body so that the valve box covers the discharging port of the tank body, and wherein the other end of the valve box is connected to and communicates with a root of the conveying pipe, a first electromagnetic valve for closing and opening a first conduit pipe connecting the lower portion of the first check valve to a source of the compressed air, a second electromagnetic valve for closing and opening a second conduit pipe connecting the lower portion of the second check valve to the source of the compressed air, a third electromagnetic valve that can exhaust the compressed air in the first conduit pipe, a detecting means for sensing an existence or a nonexistence of the powder in the pressure tank body, and a controlling means for controlling the opening and closing of the first, the second, and the third electromagnetic valve based on the results of the detecting means, by interlocking a plurality of timers, the method comprising:

exhausting the compressed air in the tank body by opening the third electromagnetic valve after closing the first electromagnetic valve when the detecting means senses the nonexistence of the powder in the tank body, conveying the powder from the hopper into the tank body by opening the receiving port by descending the first check valve by means of its self-weight, feeding the compressed air to the second check valve and the valve box for the second check valve by opening the second electromagnetic valve, closing the discharging port of the tank body by ascending the second check valve, sensing the existence of the powder in the tank body after conveying the powder from the hopper into the tank body, opening the first electromagnetic valve after closing the third electromagnetic valve by driving the plurality of timers, feeding the compressed air to the first electromagnetic valve and the tank body, while the powder continues to flow in the tank body, closing the receiving port and pressurizing an inside of the tank body by ascending the first check valve, and feeding the powder in the tank body to the conveying pipe by opening the discharge port by descending the second check valve.

2. A method for determining intervals for feeding powder to a conveying pipe by means of compressed air in a plug conveying system that uses an apparatus for feeding powder to a conveying pipe, the apparatus including:

a hopper for storing the powder to be conveyed, wherein the hopper has an opening for discharging the powder at its lower portion, a tank body used as a structure of a pressure vessel having a receiving port at its upper portion and a discharging port at its lower portion, wherein the receiving port faces the opening for discharging the powder of the hopper, a valve box for the second check valve disposed at the lower portion of the tank body, wherein one end of the valve box is connected and sealed to the outer and lower surface of the tank body so that the valve covers the discharging port of the tank body, and wherein the other end of the valve box is connected to and communicates with a root of the conveying pipe, a first check valve disposed inside the tank body and just under the receiving port so that it can freely move up and down, and so that it can close the receiving port by its upward movement that is caused by means of compressed air, a second check valve disposed inside the valve box and just under the discharging port so that it can freely move up and down, and so that it can close the discharging port by its upward movement that is caused by means of compressed air, a first electromagnetic valve for closing and opening a first conduit pipe connecting the lower portion of the first check valve to a source of the compressed air, a second electromagnetic valve for closing and opening a second conduit pipe connecting the lower portion of the second check valve to the source of the compressed air, a third electromagnetic valve that can exhaust the compressed air in the first conduit pipe, a detecting means for sensing an existence or nonexistence of the powder in the tank body, and a controlling means for controlling the opening and closing of the first, the second, and the third electromagnetic valve based on the results of the detecting means, by interlocking a plurality of timers, the method comprising:

measuring the time that is required for feeding the powder in the tank body to the conveying pipe, adjusting the times to be set by the plurality of timers to control the electromagnetic valves based on the measurements so that the pressure loss of the compressed air in the conveying pipe corresponds to the pressure of the compressed air supplied to the conveying pipe, exhausting the compressed air in the tank body by opening the third electromagnetic valve after closing the first electromagnetic valve when the detecting means senses the nonexistence of the powder in the tank body, conveying the powder from the hopper into the tank body by opening the receiving port by descending the first check valve, supplying the compressed air to the second check valve and the valve box for the second check valve by opening the second electromagnetic valve, closing the discharging port of the tank body by ascending the second check valve, opening the first electromagnetic valve after closing the third electromagnetic valve when a predetermined time has passed from the time when the detecting means senses the existence of the powder in the tank body, closing the receiving port and pressurizing an inside of the tank body by ascending the first check valve by supplying the compressed air to the first check valve and the tank body, feeding the powder in the tank body to the conveying pipe by opening the discharge port of the tank body by descending the second check valve, calculating the time that is required for feeding the powder from the tank body to the conveying pipe based on two data points regarding time measured by the controlling means, after the detecting means senses the nonexistence of the powder in the tank body, wherein one data point regarding time is the time when the first electromagnetic valve is opened, and the other data point regarding time is the time when the detecting means senses the nonexistence of the powder, calculating the time when the powder in the tank body should be supplied to the conveying pipe at the next conveyance, by multiplying the time that is required for feeding the powder from the tank body to the conveying pipe by a constant value that is determined based on the ratio of an inner volume of the conveying pipe to an inner volume of the tank body, determining the time to be set by the timer to open the first electromagnetic valve and to close the third electromagnetic valve after the detecting means senses the existence of the powder in the tank body, based on the time when the powder in the tank body should be supplied to the conveying pipe at a next conveyance, and adjusting the times to be set by the plurality of timers so that the pressure loss of the compressed air in the conveying pipe corresponds to the pressure of the compressed air supplied to the conveying pipe.

3. A method for determining intervals for feeding powder to a conveying pipe by means of compressed air in a plug-conveying system that uses an apparatus for feeding powder to a conveying pipe, the apparatus including:

a hopper for storing the powder to be conveyed, wherein the hopper has an opening for discharging the powder at its lower portion, a tank body used as a structure of a pressure vessel having a receiving port at its upper portion and a discharging port at its lower portion, wherein the receiving port faces the opening for discharging the powder of the hopper, a valve box for the second check valve disposed at the lower portion of the tank body, wherein one end of the valve box is connected and sealed to the outer and lower surface of the tank body so that the valve box covers the discharging port of the tank body, and wherein the other end of the valve box is connected to and communicates with a root of the conveying pipe, a first check valve disposed inside the tank body and just under the receiving port so that it can freely move up and down, and so that it can close the receiving port by its upward movement that is caused by means of compressed air, a second check valve disposed inside the valve box and just under the discharging port so that it can freely move up and down, and so that it can close the discharging port by its upward movement that is caused by means of compressed air, a first electromagnetic valve for closing and opening a first conduit pipe connecting the lower portion of the first check valve to a source of the compressed air, a second electromagnetic valve for closing and opening a second conduit pipe connecting the lower portion of the second check valve to the source of the compressed air, a third electromagnetic valve that can exhaust the compressed air in the first conduit pipe, a detecting means for sensing an existence or a nonexistence of the powder in the tank body, and a controlling means for controlling the opening and closing of the first, the second, and the third electromagnetic valve based on the results of the detecting means, by means of a plurality of timers, the method comprising:

measuring the pressure loss of the compressed air in the conveying pipe, adjusting the times to be set by the plurality of timers to control the electromagnetic valves based on the measurements so that the pressure loss of the compressed air in the conveying pipe corresponds to the pressure of the compressed air supplied to the conveying pipe, exhausting the compressed air in the tank body by opening the third electromagnetic valve after closing the first electromagnetic valve when the detecting means senses the nonexistence of the powder in the tank body, conveying the powder from the hopper into the tank body by opening the receiving port by descending the first check valve, supplying the compressed air to the second check valve and the valve box for the second check valve by opening the second electromagnetic valve, closing the discharging port of the tank body by ascending the second check valve, opening the first electromagnetic valve after closing the third electromagnetic valve when a predetermined time has passed from the time when the detecting means senses the existence of the powder in the tank body, closing the receiving port and pressurizing an inside of the tank body by ascending the first check valve by supplying the compressed air to the first check valve and the tank body, feeding the powder in the tank body to the conveying pipe by opening the discharge port of the tank body by descending the second check valve, measuring the pressure loss of the compressed air in the conveying pipe when the powder is supplied to the conveying pipe by closing the third electromagnetic valve and by opening the first electromagnetic valve, and adjusting the times to be set by the plurality of timers so as to have the time when the powder should be supplied to the conveying pipe at a next conveyance extended if the pressure loss of the compressed air in the conveying pipe is greater than the pressure of the compressed air supplied to the conveying pipe, or so as to have the time when the powder should be supplied to the conveying pipe at a next conveyance advanced if the pressure loss of the compressed air in the conveying pipe is less than the pressure of the compressed air supplied to the conveying pipe, based on the measurement of the pressure loss.

* * * * *